US00RE41979E

(19) United States
(12) Reissued Patent
Latiolais, Jr. et al.

(10) Patent Number: US RE41,979 E
(45) Date of Reissued Patent: Dec. 7, 2010

(54) FLOW CONTROL APPARATUS AND METHOD

(75) Inventors: Burney J. Latiolais, Jr., Lafayette, LA (US); Braxton I. Moody, V, Lafayette, LA (US); Keith T. Lutgring, Lafayette, LA (US); Donald E. Mosing, Lafayette, LA (US)

(73) Assignee: Frank's Casing Crew and Rental Tools, Inc., Lafayette, LA (US)

(21) Appl. No.: 11/039,453

(22) Filed: Jan. 20, 2005

Related U.S. Patent Documents

Reissue of:
(64) Patent No.: 6,508,312
Issued: Jan. 21, 2003
Appl. No.: 10/075,155
Filed: Feb. 13, 2002

(51) Int. Cl.
*E21B 43/12* (2006.01)

(52) U.S. Cl. ..... 166/386; 166/373; 166/317; 166/319

(58) Field of Classification Search ..... 166/317, 166/319, 320, 325, 373, 386, 185, 187, 188
See application file for complete search history.

(56) References Cited

U.S. PATENT DOCUMENTS 2,251,244 A * 7/1941 Stanley ..... 166/370
2,791,279 A * 5/1957 Clark, Jr. ..... 166/320
2,846,015 A * 8/1958 Pittman ..... 137/515
3,205,955 A * 9/1965 Whittle ..... 175/235
3,385,370 A * 5/1968 Knox et al. ..... 137/515
3,481,397 A * 12/1969 Baker ..... 166/320
3,616,851 A * 11/1971 Garcia ..... 166/317
3,997,009 A * 12/1976 Fox ..... 175/107
4,361,187 A * 11/1982 Luers ..... 166/326
4,393,930 A * 7/1983 Ross et al. ..... 166/188
4,691,775 A * 9/1987 Lustig et al. ..... 166/317
4,729,432 A * 3/1988 Helms ..... 166/317
5,275,241 A * 1/1994 Vigor et al. ..... 166/373
5,366,009 A * 11/1994 Cornette et al. ..... 166/51
5,641,021 A * 6/1997 Murray et al. ..... 166/291
5,765,641 A * 6/1998 Shy et al. ..... 166/292
6,082,457 A * 7/2000 Best et al. ..... 166/178
6,082,459 A 7/2000 Rogers et al.
6,182,766 B1 * 2/2001 Rogers et al.
6,390,200 B1 * 5/2002 Allamon et al. ..... 166/376
6,401,822 B1 * 6/2002 Baugh ..... 166/319
6,666,273 B2 * 12/2003 Laurel ..... 166/382
6,832,656 B2 * 12/2004 Fournier et al. ..... 166/373

* cited by examiner

*Primary Examiner*—Shane Bomar
(74) *Attorney, Agent, or Firm*—The Matthews Firm

(57) ABSTRACT

A fluid flow control apparatus for use in a mid-string location in a pipe string being run into a well has an open fluid flow route to the annulus above the apparatus to provide more flow area for upwardly moving fluid. Flow up the upper pipe string bore is resisted to reduce fluid overflow from the top of the pipe string. Fluid flow down the pipe string bore closes the fluid channel between the lower pipe string bore and the upper annulus and blows out a pipe bore flow resisting element for free down flow of fluids in the pipe string bore.

23 Claims, 2 Drawing Sheets

(Amended)

FIG. 3 (Amended)
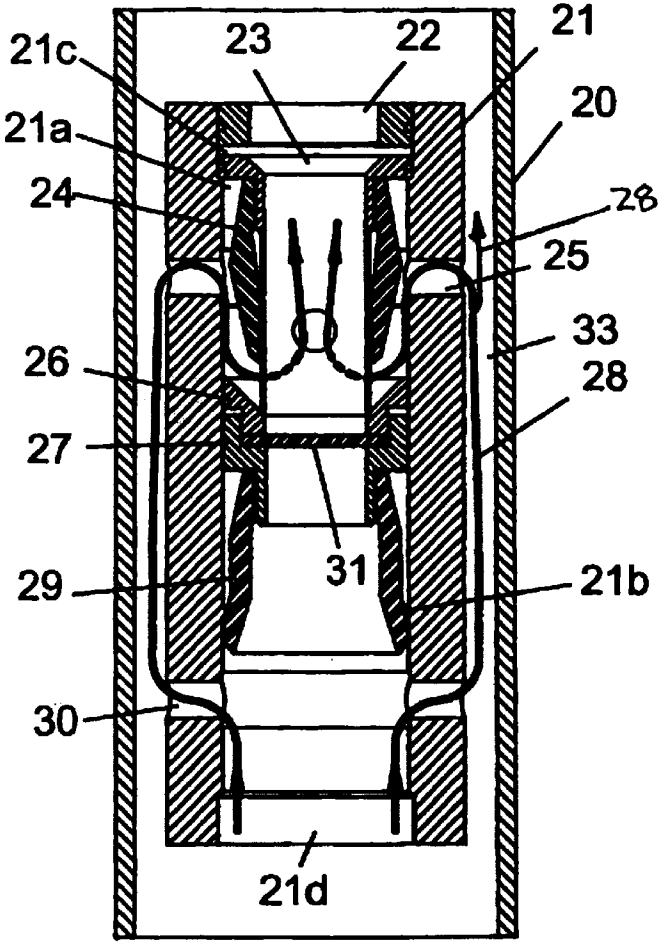

FLOW CONTROL APPARATUS AND METHOD

Matter enclosed in heavy brackets [ ] appears in the original patent but forms no part of this reissue specification; matter printed in italics indicates the additions made by reissue.

This invention pertains to pipe string components used to exercise flow controls primarily, but not in a limiting sense, for use in wells during completion work. The invention reduces surge pressure down hole and surge pressure induced flow from the top of pipe strings being run into wells.

BACKGROUND OF INVENTION

During the completion of petroleum related wells several lengths of casing are run into the well while it is filled with mud or well produced fluids. While the rather long strings of pipe are moving into the well, the fluids fill the newly lowered pipe.

If casing or liner pipe strings are moving axially along the well bore the resulting pressure differentials along the bore can be destructive. The casing acts as a pump plunger and may be driven by several hundred tons of steel pipe. Serious formation damage can result. To prevent formation damage, the pipe string is moved slowly to allow fluid to flow around and through the pipe string to reduce the pressure effects. Moving slowly takes more time for well completion and time is costly and may well invite hazards to property and personnel.

When the formation damage risk is avoided, there are other problems that arise from moving pipe into wells. There is some flow resistance and the fluid is still flowing into the moving pipe when the top end of the pipe string is stopped just above the rig floor to add a new pipe section to the string. Flowing fluid, in a long pipe, is not easily stopped and it flows out the top of the pipe, usually before downward movement of the string is completed. The well fluid flows over personnel, rig machinery, and rig floor. The fluid adds to personnel risks, is slippery, and generally unpleasant.

Casing or liner that does not extend to the surface when installed is put in place by a working string that is, finally, disconnected from the placed installation string. The working and installation strings are connected by an adapter. The working string has a small bore compared with the flow area of the annulus between the working string and the well bore. The flow area of the annulus is needed to reduce surge pressure below the installation string. Fluids below the casing are less likely to build up destructive pressure that damages formation, or flow over the top end of the working string if they can be vented into the well annulus above the pipe string being installed.

The adapters have been constructed such that the upwardly moving fluid can flow in both the annulus and the pipe string bore. Further adaptation has made it possible to pump fluid down the string without losing it to the annulus at the adapter. When installing pipe strings in wells it is often necessary to circulate to ease past tight spots and to blow out bridges.

To date, maximizing protection of the formation, and optimizing installation speed has not eliminated the overflow of fluid at the top of the working string. The prospect of using a flow resistor in the working string bore is discouraged because a wide open pipe bore is needed for some well completing operations, including the running of cement. There is a need to provide means to allow free flow downwardly in the working string, but to restrict upwardly moving fluid so that the annulus fluid level, drained at the surface, will be above the level of fluid rising in the bore of the working string. Then, fluid will not flow over the top of the working string.

SUMMARY OF THE INVENTION

The apparatus of the invention will usually be installed between a working pipe string, usually a drill string, and an installation pipe string such as casing or a casing liner. The arrangement permits upward flow of fluid in both the bore and annulus of the working string. Flow up the working string bore is resisted so that flow will not rise in the working string and spill over the top. The need to pump fluid down working and the installation strings to cope with problems, and proceed with completion is satisfied by a controllable secondary up-flow route. Fluid from the bore of the installation string, with up-flow blocked by a temporary blockage in the string bore, passes through a closable pipe wall opening to the working string annulus and is admitted back to the working string bore through a check valve that resists inward flow and prevents out flow. Surge pressure is reduced without allowing fluid to spill over the top of the working string.

To close the secondary flow route and open the temporarily blocked pipe string bore, a pressure sensitive blow-out element is carried by a piston that closes the secondary flow route in response to forced down flow in the working string bore. The secondary flow route is closed before the downflow in the working string bore blows the obstruction out of the piston. The obstruction may be a burst disc-or an elastomer ball that will blow through an undersize hole at a selected pressure.

In the event it becomes necessary to pump fluid down the bore of the working string before the installation string is finally in place, another similar apparatus can be installed in the working string as it's assembly proceeds. The resisted upward flow in the newly installed adapter will prevent overflow of the top of the pipe string.

These and other objects, advantages, and features of this invention will be apparent to those skilled in the art from a consideration of this specification, including the attached claims and appended drawings.

BRIEF DESCRIPTION OF DRAWINGS

FIG. 3 is a side view, in cut-away, of the apparatus of the invention.

DETAILED DESCRIPTION OF DRAWINGS

Figure 1:
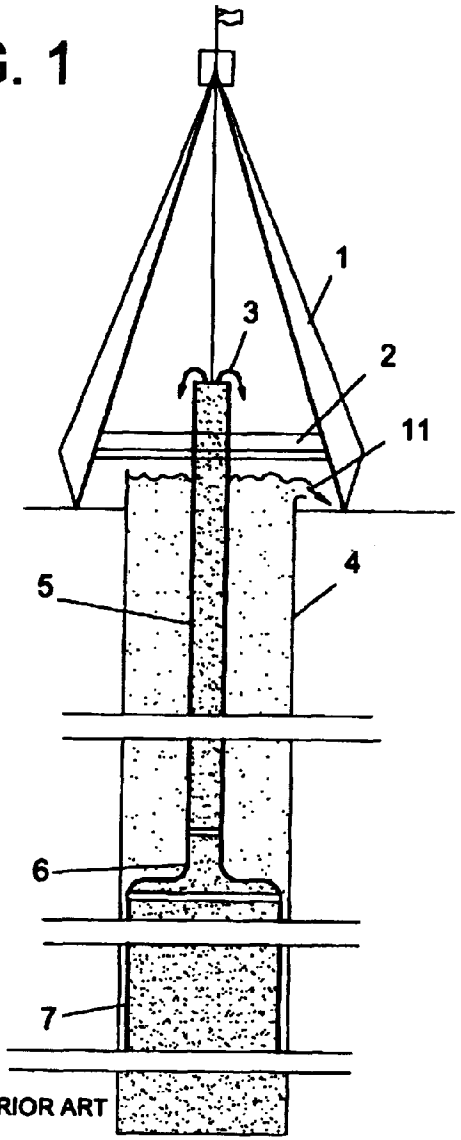
FIG. 1 is a side view, in cut away, illustrates schematically the circumstance indicating need for the invention.

FIG. 1 shows, schematically, a stick derrick 1, working platform 2, overflow 3, and annulus outflow 11 in a prior art circumstance. Well bore 4 is receiving an installation string of pipe 7 (usually casing or liner) which is attached to working string 5 by way of adapter 6.

Figure 2:
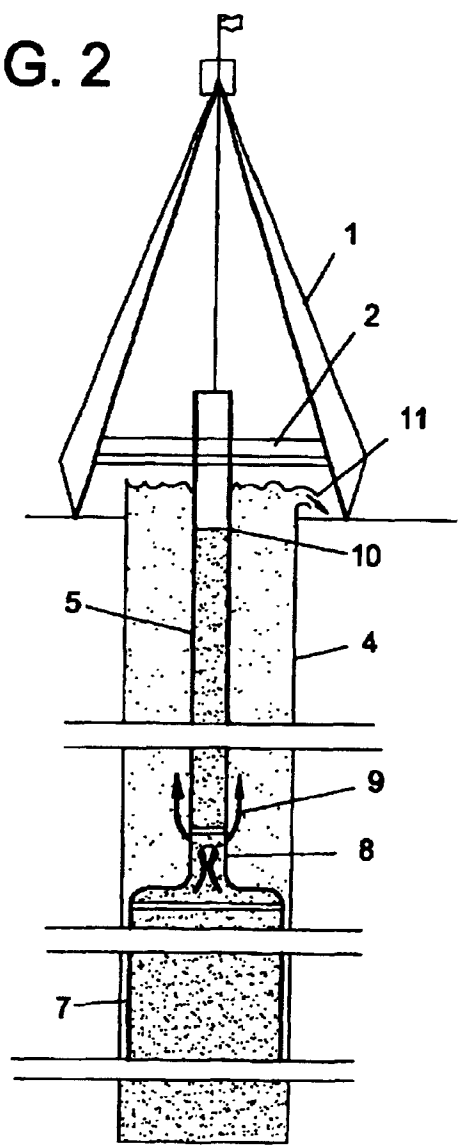
FIG. 2 is identical to FIG. 1 but after actuation of the apparatus of the invention.

FIG. 2 is identical to FIG. 1 excepting the placement of the apparatus of this invention 8 between the two pipe strings. Apparatus 8 admits flow from the installation casing bore to the annulus above the installation string to working string adapter. Apparatus 8, of this invention, may be embodied into the form of the adapter shown as 6 in FIG. 1. The apparatus of this invention can be placed some distance from the adapter, in either pipe string, and serve fully as the equivalent of an embodiment of the apparatus in the adapter.

FIG. 3 shows body 21, in pipe string (or well bore) 20, with pistons 23 and 27 situated in bore 21a. Piston 27 carries a burst disc 31, retained by ring 26, and can move downward until it encounters stop ring 21b. The upper end of piston 23 is trapped in bore 21c. Fluid moving up the pipe string bore, before the burst disc is actuated, enters the bore 21d, flows through side ports 30, moves upward (28) in the annulus 33, into ports 25, downward past valve skirt 24, upward through bore 22 and along the bore of pipe string 5. Check valve skirt 24 allows flow into bore 22 but not outward through ports 25.

Rubber element 24 resists, but accepts, fluid from the annulus 33. Fluids can flow upward in both annulus 33 and the bore of pipe string 5. The flow resistance of valve skirt 24 slows the flow of fluid into the bore of pipe string 5 and the upper surface of the fluid columns are uneven. The top of fluid in the pipe bore will be below the surface of outflowing annulus fluid 11. The fluid overflow 3 of FIG. 1 will not occur, and work platform 2 will be cleaner and safer.

Figure 4:
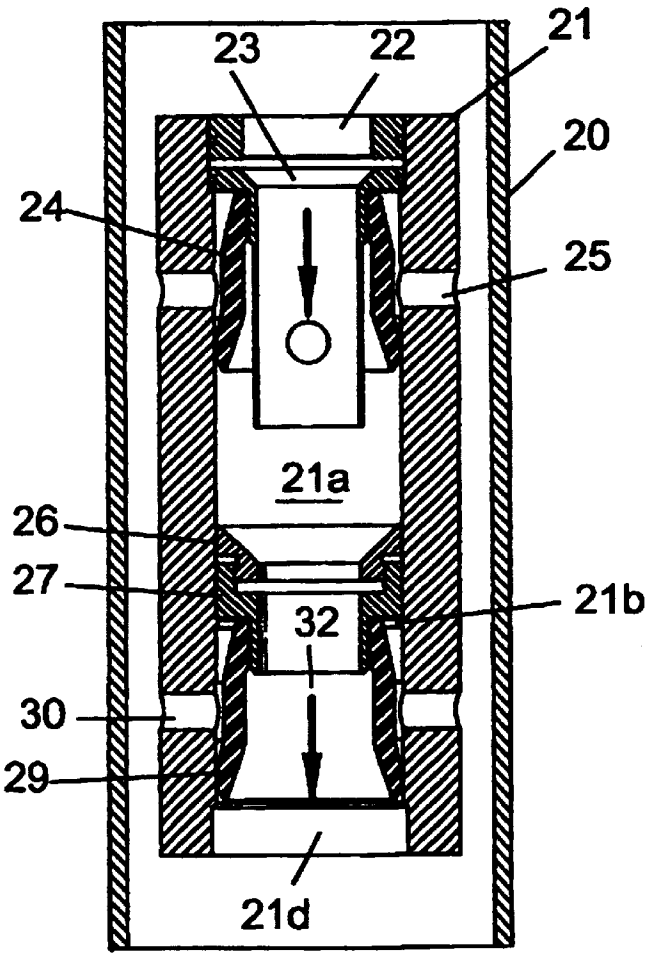
FIG. 4 is a side view, similar to FIG. 3, after the apparatus is actuated.

When it is necessary to pump fluids down the pipe string bore, the configuration of FIG. 4 results. In actuating to the state of FIG. 2, the flow first moves piston 27 down such that valve skirt 29 closes ports 30 to outward fluid flow. Further flow of fluid down the bore ruptures disc 31 (a removable flow inhibiting element) and opens the pipe string bore to downward flow of fluid. Disc 31 may be pliable, flexible, or frangible if it controllably yields to a certain pressure. The burst disc may simply deform and escape confining recesses. An elastomer ball, under certain propelling force, can be pushed through an undersize hole to serve as an alternative bore obstruction responsive to fluid flow for removal. Discs can be devised to warp to extract themselves from retaining grooves when urged by selected pressure. Fluids can still flow up both pipe bore and annulus but cannot move from pipe bore to annulus. Fluid pumped down the working string bore will now be forced down the bore of the installation string.

If further pipe sections are to be added at the surface, after actuation of the blow-out obstruction is removed, an additional apparatus such as shown in FIG. 3 can be added to the string.

From the foregoing, it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and sub-combinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, we claim:

1. Apparatus for use down hole in a pipe string, when running pipe strings into a well, for management of surge pressure and the resulting fluid flow, the apparatus comprising:

a) a body to function as a serial pipe string element, with [means] *threaded connections* at each end to connect to continuing pipe string elements, having a generally central bore and first and second ports to conduct fluid through the apparatus wall;

b) a removable flow inhibiting element, in said generally central bore situated to fluidly separate said first and second ports, removable by fluid down-flow in said generally central bore;

c) a movable element in said generally central bore, responsive to downward flow of fluid in said generally central bore to close said second ports to outwardly directed flow;

d) a [check] valve in said generally central opening arranged to cooperate with said first ports to resistively admit flow to said generally central bore and prohibit flow from said generally central bore through said first ports.

2. The apparatus of claim 1 wherein said movable element is a piston and carries said removable flow inhibiting element.

3. The apparatus of claim 2 wherein said piston carries a flexible tubular element arranged to cover said second ports to prevent the flow from the generally central bore and to deform to resist but admit the flow into the generally central bore.

4. The apparatus of claim 2 wherein said removable flow inhibiting element is a rupture disc that breaks when stressed by a selected range of pressure.

5. The apparatus of claim 2 wherein said removable flow inhibiting element is an elastomer element that is forced through a hole when stressed by a selected range of pressure.

6. The apparatus of claim 1 wherein said [check] valve is a flexible tubular element arranged to cover said first ports to prevent outflow and to deform to resist but admit inward flow.

7. A method for control of fluids displaced from a well during the running in of a first tubular string, to be installed in the well, the first tubular string suspended by a connecting adapter from a second, working, tubular string, the method comprising the steps:

a) providing a flow path for fluids displaced from the well;

b) said flow path including the bore of the first tubular string, first ports through a wall of the adapter to the well annulus, some distance along the annulus, second ports through a wall of the adapter to the bore of the second tubular string, and upward in both bore and annulus of the second tubular string, thus reducing surge pressure in the well;

c) placing a down flow responsive removable occlusion [means] between said first and second ports during assembly of said tubular strings;

d) placing [check] valve equivalents to prohibit flow from the bore of the adapter to the well annulus;

e) placing a down flow responsive movable element in said adapter to activate a [check] valve equivalent to cooperate with the first ports to prohibit flow through the first ports to the annulus;

f) pumping fluid down the working pipe string bore to blow out the occlusion [means]; and g) finishing the well servicing operation.

*8. A method for running tubular string into an earth wellbore containing fluids, wherein the flow of fluids from the interior of the wellbore to the earth's surface follows two paths, a first path through the center bore of said tubular string, and a second path being the annulus at least partially surrounding the exterior of said tubular string, comprising the steps of:*

*a) running the tubular string into the earth wellbore;*

*b) allowing the fluids in the second path to reach a given vertical level; and*

*c) controlling the fluids in the first path to be at a vertical level at or below the vertical level of the fluids in said second path, said controlling step comprising the diverting of the fluids in said first path through a side wall at least partially surrounding said first path into the second path.*

*9. The method according to claim 8, wherein said tubular string comprises an installation string and a working string.*

*10. The method according to claim 8, wherein the tubular string includes a removable flow element positioned within the center bore of the tubular string.*

*11. The method according to claim 10, wherein said removable flow element is a rupture disc.*

*12. The method according to claim 11, including the additional steps of pumping fluid from the earth's surface through the center bore of said tubular string to rupture or otherwise deform said rupture disc, and continuing, as desired, to pump such fluid from the earth's surface down through said tubular string.*

*13. A method for running tubular string into an earth wellbore containing fluids, wherein the flow of fluids from the interior of the wellbore to the earth's surface follows two paths, a first path through the center bore of said tubular string, and a second path being the annulus at least partially surrounding the exterior of said tubular string, comprising the steps of:*

*a) running the tubular string into the earth wellbore, wherein said tubular string includes a removable flow element positioned within the center bore of the tubular string;*

*b) diverting the well fluids located in said center bore beneath the removable flow element, to said second path and then re-diverting a portion of said fluid back from said second path into said first path at a location within the center bore of said tubular string above said removable flow element;*

*c) allowing the fluids in the second path to reach a given vertical level; and*

*d) controlling the fluids in the first path to be at a vertical level at or below the vertical level of the fluids in said second path.*

*14. The method according to claim 13, wherein said tubular string comprises an installation string and a working string.*

*15. The method according to claim 14, wherein said removable flow element is a rupture disc.*

*16. The method according to claim 15, including the additional steps of pumping fluid from the earth's surface through the center bore of said tubular string to rupture or otherwise deform said rupture disc, and continuing, as desired, to pump such fluid from the earth's surface down through said tubular string.*

*17. A method for running tubular string into an earth wellbore containing fluids, wherein the flow of fluids from the interior of the wellbore to the earth's surface follows two paths, a first path through the center bore of said tubular string, and a second path being the annulus at least partially surrounding the exterior of said tubular string, comprising the steps of:*

*a) running the tubular string into the earth wellbore; and*

*b) controlling the relative vertical levels of the fluids in said first and second paths to prevent the fluid in the first path from overflowing onto the rig floor located at the earth's surface, said controlling step comprising the diverting of the fluids in said first path through a side wall at least partially surrounding said first path into the second path.*

*18. The method according to claim 17, wherein said tubular string comprises an installation string and a working string.*

*19. The method according to claim 17, wherein the tubular string includes a removable flow element positioned within the center bore of the tubular string.*

*20. The method according to claim 19, wherein said removable flow element is a rupture disc.*

*21. The method according to claim 20, including the additional steps of pumping fluid from the earth's surface through the center bore of said tubular string to rupture or otherwise deform said rupture disc, and continuing, as desired, to pump such fluid from the earth's surface down through said tubular string.*

*22. The method according to claim 8, wherein said controlling step further comprises the re-diverting of at least a portion of said fluids back from said second path into said first path.*

*23. The method according to claim 17, wherein said controlling step further comprises the re-diverting of at least a portion of said fluids back from said second path into said first path.*

* * * * *